Sept. 28, 1965 J. WILHELM 3,208,741
METHOD AND SYSTEM FOR THE AUTOMATIC CONTROLLING
OF GRID COOLERS OR TRAVELING GRIDS
Filed Sept. 20, 1961 2 Sheets-Sheet 1

Inventor:
Josef Wilhelm
Burgess, Dinklage & Sprung
Attorneys

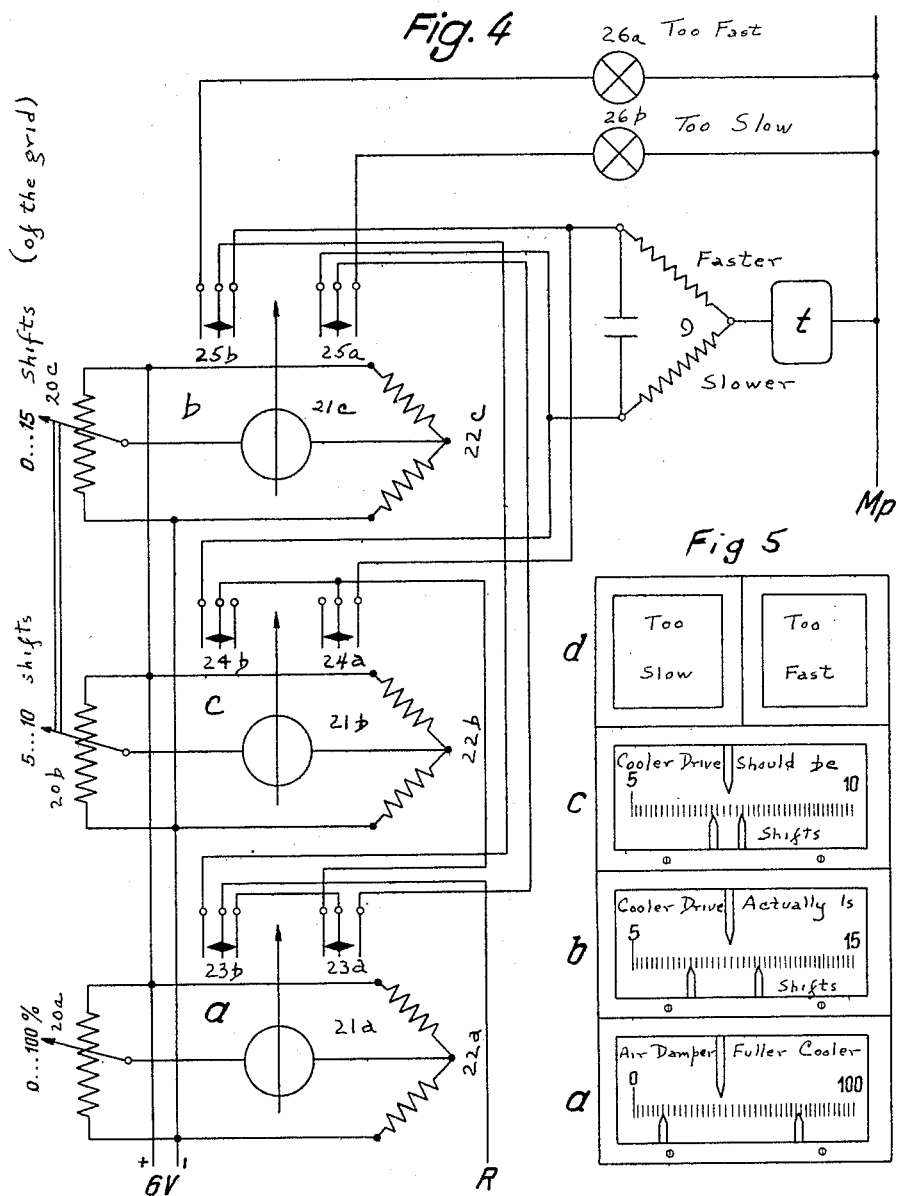

United States Patent Office 3,208,741
Patented Sept. 28, 1965

3,208,741
METHOD AND SYSTEM FOR THE AUTOMATIC CONTROLLING OF GRID COOLERS OR TRAVELING GRIDS
Josef Wilhelm, Wulfrath, Rhineland, Germany, assignor to Rheinische Kalksteinwerk G.m.b.H., a German corporation
Filed Sept. 20, 1961, Ser. No. 139,487
Claims priority, application Germany, Sept. 24, 1960, R 28,803
2 Claims. (Cl. 263—32)

This invention concerns a method and system for the automatic controlling of grid coolers for cement, limestone and dolomite, and also for the controlling of traveling-grid coolers, and for the controlling of traveling grids, such as Lepol traveling grids, for the drying or calcining of the feed material in the kiln exhaust gas.

In order to operate a grid cooler, for example, under optimum conditions, i.e., to operate it at any desired preset grid plate temperature and achieve the maximum recovery of heat from the cooling air, and still achieve an optimum throughput of clinker that varies in grain size and enters the cooler at varying temperatures, many interdependent factors have to be varied and adjusted within certain limits, so that optimum heat recovery is not possible with manual control, and the rate of the thermal destruction of the grid plates cannot be kept within tolerable limits. A semi-automatic control has been known hitherto, but it causes very great fluctuations in the system since there is an inevitable delay in the action of the controlling devices and the system is unable to compensate for the delays.

Under the invention, a method and system is proposed for the automatic controlling of the grid cooler or traveling grid cooler used for cement, limestone, dolomite etc., in which the overall regulation is based upon the maintenance of a predetermined grid plate temperature. By this method it has become possible for the first time to maintain optimum conditions automatically in the operation of a grid cooler. The advantages of this method are an increased kiln throughput, a more constant temperature curve throughout the kiln, and hence uniform clinker quality and lower fuel consumption; furthermore, the grid plates last longer, thus avoiding kiln shutdowns for repairs.

Figure 1:
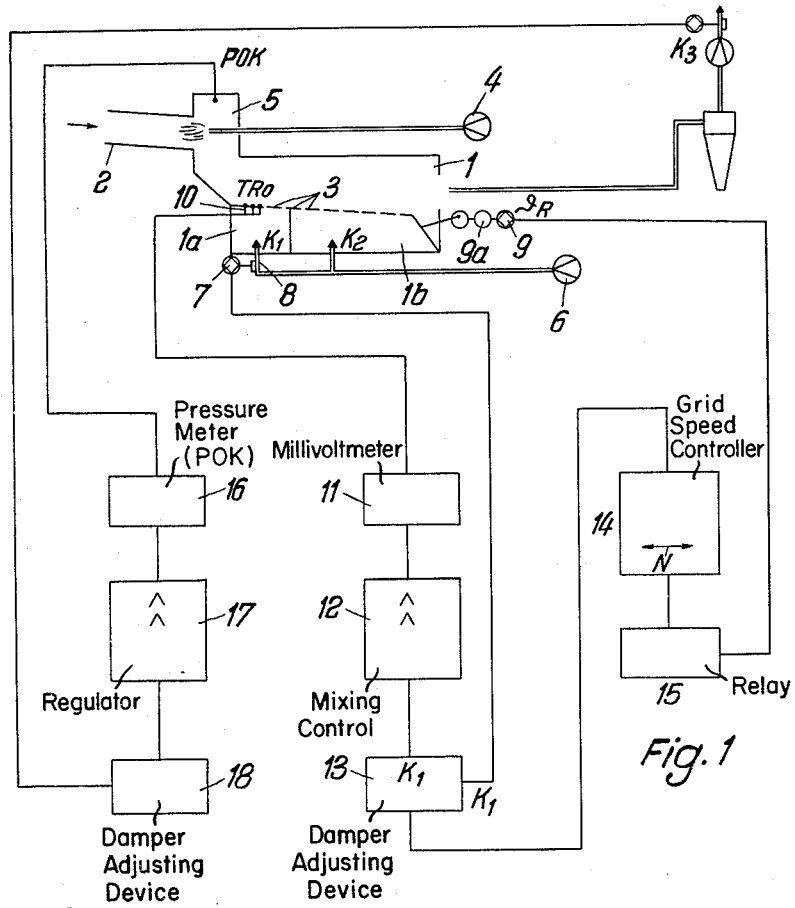
Figures 2, 3:
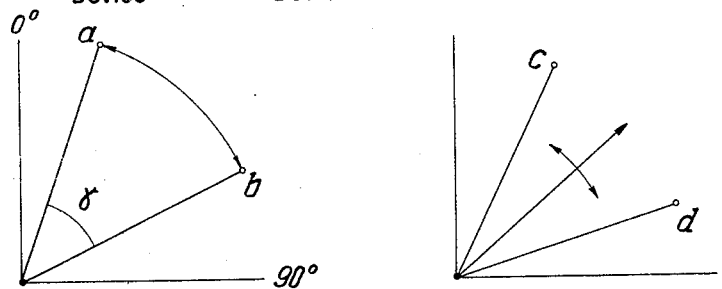

The invention will be explained hereinafter on the basis of drawings, wherein:

FIG. 1 is a block diagram of a grid cooler;
FIG. 2 shows the manner of operation of the damper that controls the cooling air;
FIG. 3 shows the grid speed is varied according to the damper setting;
FIG. 4 is a diagrammatic representation of the circuit of the switching relays to control automatically the air flow and grid operation; and
FIG. 5 is a view showing the dial arrangement and signals of the relays of FIG. 4.

First we shall explain the operation of the grid cooler with the aid of FIG. 1. The grid cooler 1 receives from the rotary kiln 2 the highly heated mineral, which spreads out on the grid plates 3 and is driven over the grid surface by the movement of the said grid plates 3.

By means of a blower 4, primary air mixed with coal dust is fed to the kiln 2 and is blown into the kiln tube as a flame. To cool the clinker on the grid plates and also support combustion in the kiln, additional air is injected by a fan 6 under the grid plates 3.

A portion of this additional air is fed as secondary air to the kiln tube and contains a certain amount of heat, depending on the efficiency of the cooler; another portion of this additional air passes out of the cooler as exhaust.

The amount of this additional air is regulated by dampers 8, which are operated by a servomotor 7. The grid plates are driven by a motor 9 whose speed is greatly reduced by a variable speed transmission which is controlled by a servomotor 9a. It is furthermore important to the overall control of the grid cooler that the pressure in the kiln head 5 be kept constant. A known combustion chamber pressure regulating system is provided for this purpose. In accordance with the pressure POK in the kiln head, a damper adjusting device 18 in the cooler chimney or following the exhaust fan is actuated by means of a pressure indicating meter 16 and a regulator 17. This combustion chamber pressure control is known and is not per se the subject of the present invention; it must, however, be mentioned here, since it is useful in the perfect operation of the grid cooler.

In the grid cooler, the following factors are at work, which influence one another and have to be adjusted to an optimum:

(1) Throughput of mineral, with varying input temperature and clinker grain size.
(2) Grid plate temperature, upon which the life of the plates depends.
(3) Rate of flow of cooling air, which is controlled by dampers and is fed into the kiln as secondary air at the highest possible temperature.
(4) Depth of the mineral on the grid plates, which is determined by the grid speed and influences not only the temperature of the secondary air but also the temperature of the grid plates.

These four factors have to be controlled so that, even in the case of variations in the throughput of the mineral, the grid speed is so controlled, and the rate of flow of cooling air is so adjusted, while being kept to a minimum, that a predetermined grid temperature can be maintained and, at the same time, the secondary air is fed into the kiln at the highest possible temperature in order to achieve optimum heat recovery.

According to the invention, the entire control is derived from the maintenance of a predetermined grid temperature. The basic design of this control is shown in the block diagram in FIG. 1.

At the beginning of the row of grid plates 3, there is placed on those grid plates which are subjected to the greatest heat danger a plurality of thermocouples 10, which can be connected in parallel or in series. The output voltage of the thermocouples is applied through a millivoltmeter 11 to a mixing control 12, and the damper adjusting device 13, which controls the servomotor 7 and hence the position of the damper 8. To reinforce the action of the cooling air control and keep the temperature of the grids within a certain prescribed range, the speed of the grid action is increased or decreased, as required, by means of grid speed controller 14 which controls time relays and contactors 15, which operate the stepping control 9a on the motor 9. The flow of the cooling air is controlled within a certain normal operating range in this manner (see FIG. 2, angle γ). If one of the preselected threshold contacts a or b is passed, a corresponding stepwise adjustment of the grid speed is performed through a time-delay relay. If contact a is passed, the grid speed is retarded. If contact b is passed, the grid speed is increased. Within the angle γ the grid speed remains constant. The angle of the damper action ranges from 0 to 90°, but it can be restricted by special limiting switches.

FIG. 3 shows the variation of the grid speed according to the cooling air damper setting. If, due to some disturbance or drop in temperature, the clinker from the kiln is not sufficiently hot (indicated by thermocouple 10), so that the secondary air does not gain sufficient heat, the cooling air control damper will swing beyond threshold contact *a* (see FIG. 2) and, through a relay circuit controlling the grid drive, will slow the operation of the grid.

Vice versa, in the event of abnormally high grid heat, the grid speed is increased by the action of threshold contact *b*. In this manner, the effect of the cooling air is reinforced by the variation of the grid speed. When the cooling air damper comes back to the area between the preset threshold contacts *a* and *b*, that is, into the normal range, the grid speed is again changed to the predetermined normal speed.

If abnormal conditions should persist, the limiting contacts *c* or *d* in FIG. 3 would be reached, which determine the top and bottom limits of the grid speed, and will cause an acoustical and optical signal to be given as to warn the operator to intervene.

The method is applicable to all kinds of cooling grids for cement, limestone, dolomite, etc. When it is used with a traveling grid, the thermostats 10 are located a slight distance underneath the moving plates 3 and are connected either in parallel or in series.

The regulating action in the automatic control of the grid cooler is as follows:

When the predetermined temperature is reached in the grid plate, the rate of flow of the cooling air is so adjusted that the proper grid temperature is maintained. If, in the course of operations, one or the other threshold contact, as already described above, is passed, the grid speed is increased or reduced accordingly, so as to reinforce the action of the cooling air system, until the damper setting has returned to a prescribed point between the two threshold contactors, whereupon the grid speed returns again to normal. In case of necessity, the automatic control can be corrected manually from a central kiln control booth through appropriate circuitry. Furthermore, the presenting of the controls can be performed from the said booth.

Through the method of the invention, the fully automatic operation of a grid cooler is achieved for the first time, and very good results have been achieved with the installation described above, both as regards ease and reliability of operation and as regards thermal economy.

The invention is not restricted to the known controlling members shown and described above. Many different modifications can be made within the framework of the method. For example, the regulating of the flow of cooling air can be performed by valves rather than by dampers, or an apparatus on the order of a pressure gauge can be provided, with a sliding pointer for the controlling of the grid speed.

The operation of the equipment will be explained hereinafter with the aid of an example of embodiment according to FIGS. 4 and 5.

If the air flow exceeds an adjusted maximum or minimum value *a* as indicated in FIG. 5 the control contacts 24*a* and 24*b* are operated through the rest contacts of the indicator *c* indicating the nominal value and the refrigerator through the motor 9 and the conduits M*p* and R is operated faster or slower if the adjusted threshold value, for example 4 or 11 shifts, is exceeded or falls short a further adjustment of the grid drive is impossible. The signalizing contacts 25*a* or 25*b* limit any adjusted number of shifts of the grid. The acoustic or optical signals 26*a* or 26*b* are operated. If the air flow indicator *a* returns to its threshold zone, the threshold contacts 25*a* or 25*b* are again switched off by the control contacts 23*a* or 23*b* and the threshold indicator *c* returns the grid again to the normal grid speed, for example of 7 shifts if its threshold values are adjusted for 6 or 8 shifts, such that when the contacts 24*a* and 24*b* are inwards the rest contact still is released. The parts 20*a*–20*c* are potentiometers and the potentiometers 20*b* and 20*c* are mechanically coupled. 21*a*-21*c* is the switching electronic and the parts 22*a*–22*e* are the resistances for balancing the potentiometers.

The parts *a*, *b*, *e* in FIG. 4 belong to the apparatus shown in FIG. 5. In some instances, an adaptation to the regulating range may be performed by means of appropriate impulse selection by time relays which are not represented here.

For further clarification, let us say that a kiln is to be operated as follows:

Clinker temperature upon entry into cooler 3 is to be 1400° C. The output of the kiln is to be 15 metric tons of clinker per hour. The grid plate temperature is to be held to 450° C.

In the ideal kiln operation, i.e., with a uniform kiln output, and at constant temperature in the sintering zone, and hence at uniform heat consumption, the amount of air introduced under the cooling grid would be constant. Such ideal circumstances, however, do not prevail in actual operation. Let us therefore consider a few examples:

EXAMPLE 1

The clinker size varies from fine to coarse. If it is fine, for example, the cooling action is more intensive, and the grid plate temperature would drop, in an uncontrolled operation, to 400° C., for example. But in the case of operation controlled according to the present invention, the amount of air injected under the grid is reduced, until the preset grid temperature of 450° C. is again reached. This means a reduced flow of cooling air, a rise in the secondary air temperature at constant kiln output, and no change in the amount of coal to be added, and hence a uniformly calcined sinter.

If the clinker size is too coarse, the opposite action takes place.

EXAMPLE 2

The kiln output rises from 15 to 16 metric tons per hour. In the case of non-regulated operation, the grid plate temperature would rise to about 500° C. This causes a more rapid consumption of the grid plates. In operation, regulated according to the invention, the rate of input of the cooling air is increased and the grid speed is also increased to support the action of the cooling air, until the present grid temperature of 450° C. is again reached. In this manner, the advantages mentioned in the specification are achieved.

EXAMPLE 3

The kiln momentarily has such a high heat consumption that the supply of secondary air through the cooler is inadequate. However, the grid temperature is correct, so that damper 8 remains steady and will not increase the air flow through the grid. In any case, the temperature of the secondary air would be reduced if additional air were fed through the grid, whereas it should be at the highest possible temperature. In this case, the kiln head control system 16–17–18 acts to close the exhaust damper operated by the servomotor K3 (top right of the drawing), thereby causing all of the cooling air which passes through the grid to be directed as secondary air into the kiln, thus increasing the flow of secondary air, until the preset pressure is again reached in kiln head 5.

What is claimed is:

1. System for automatic control of a plant of the character described including a kiln and a traveling grid cooler for material delivered from the kiln, based upon the maintenance of a predetermined grid plate temperature range, means for measuring temperature of the grid, means to deliver air to the grid for cooling said grid and materials, means for varying the air flow to vary the grid temperature to reduce change in the grid temperature and tend to maintain the grid temperature within a selected temperature range, said means for varying air flow being responsive to said temperature measuring means, and means for varying the speed of the grid to vary the speed of advance of the material by the grid upon the grid temperature becoming outside of said range to return the grid temperature to within said range, said means for varying speed of the grid also being responsive to the said temperature measuring means.

2. Process for controlling the temperature of a traveling kiln cooling grid which comprises:
   (a) passing hot material from a kiln to the grid for movement of the material by the grid as a bed on the grid;
   (b) passing air through the grid and the material on the grid to cool the material;
   (c) sensing temperature of the grid;
   (d) varying the air flow in dependence on the temperature sensed to vary the grid temperature to reduce change in the grid temperature and tend to maintain the grid temperature within a selected temperature range;
   (e) varying the speed of the grid in dependence on the temperature sensed to vary the speed of advance of the material by the grid upon the grid temperature becoming outside of said range to return the grid temperature to within said range.

References Cited by the Examiner

UNITED STATES PATENTS

| | | | |
|---|---|---|---|
| 2,031,049 | 2/36 | Lee | 263—32 |
| 2,041,142 | 5/36 | Norvig | 263—32 |
| 2,068,574 | 1/37 | Smith | 34—20 X |
| 2,084,976 | 6/37 | Puerner | 263—32 |
| 2,095,446 | 10/37 | Lee | 263—32 |
| 2,214,345 | 9/40 | Pike | 263—53 |
| 2,879,983 | 3/59 | Sylvest | 263—32 |

CHARLES SUKALO, *Primary Examiner.*

FREDERICK L. MATTESON, JR., *Examiner.*

UNITED STATES PATENT OFFICE
CERTIFICATE OF CORRECTION

Patent No. 3,208,741

September 28, 1965

Josef Wilhelm

It is hereby certified that error appears in the above numbered patent requiring correction and that the said Letters Patent should read as corrected below.

In the grant, lines 2 and 12, and in the heading to the printed specification, line 6, for "Rheinische Kalksteinwerk G.m.b.H.,", each occurrence, read -- Rheinische Kalksteinwerke G.m.b.H., --; column 3, line 16, after "given" insert -- so --; line 70, for "and" read -- or --; line 70, after "are" insert -- overrun --.

Signed and sealed this 10th day of May 1966.

(SEAL)
Attest:

ERNEST W. SWIDER
Attesting Officer

EDWARD J. BRENNER
Commissioner of Patents